(12) United States Patent
Shim

(10) Patent No.: US 8,113,811 B2
(45) Date of Patent: Feb. 14, 2012

(54) MANUFACTURING NANOCOMPOSITES

(75) Inventor: Youngtack Shim, Seoul (KR)

(73) Assignee: SNU R&DB Foundation, Seoul (KR)

( * ) Notice: Subject to any disclaimer, the term of this patent is extended or adjusted under 35 U.S.C. 154(b) by 773 days.

(21) Appl. No.: 12/200,447

(22) Filed: Aug. 28, 2008

(65) Prior Publication Data
US 2010/0055385 A1    Mar. 4, 2010

(51) Int. Cl.
*B29C 47/06* (2006.01)
(52) U.S. Cl. ............... 425/131.1; 425/376.1; 425/378.1; 425/462
(58) Field of Classification Search ............... 425/131.1, 425/376.1, 378.1, 462
See application file for complete search history.

(56) References Cited

U.S. PATENT DOCUMENTS

| | | | |
|---|---|---|---|
| 2,962,786 A * | 12/1960 | Hawk, Sr. et al. | 425/131.1 |
| 3,664,790 A * | 5/1972 | Hollander | 425/131.1 |
| 5,258,160 A * | 11/1993 | Utsumi et al. | 264/558 |
| 2005/0256242 A1 | 11/2005 | Ottaviani et al. | |
| 2008/0152896 A1 | 6/2008 | Moorlag et al. | |
| 2009/0226711 A1 | 9/2009 | Silvi et al. | |
| 2010/0047570 A1 * | 2/2010 | Shim | 428/372 |

* cited by examiner

*Primary Examiner* — Yogendra Gupta
*Assistant Examiner* — Joseph Leyson
(74) *Attorney, Agent, or Firm* — Knobbe, Martens, Olson & Bear, LLP

(57) ABSTRACT

Techniques for preparing PNCs are provided. In one embodiment, a polymer extruding device may include a barrel configured to accommodate a composite material, a shaft rotatably disposed in the barrel, and a motor coupled to the shaft and configured to rotate the shaft, thereby moving the composite material. The polymer extruding device may further include a die including one or more injectors configured to inject nano particles into the die to cause shear stress to be exerted to the composite material, thereby forming a layer of the nano particles on a surface of the composite material.

21 Claims, 7 Drawing Sheets

MANUFACTURING NANOCOMPOSITES

TECHNICAL FIELD

The present disclosure relates generally to nanocomposites and, more particularly, to polymer nanocomposites.

BACKGROUND

Recent advances in nanotechnology have allowed the development of various new, useful materials with enhanced mechanical and/or chemical properties by integrating nanoparticles with larger, matrix structures (e.g., polymer matrix). One such example includes nanocomposites.

Nanocomposites are materials that are formed by incorporating nanoparticles into a macroscopic material in a scale of millimeters or micrometers, and the resulting nanocomposite material may exhibit drastically enhanced properties. For example, adding carbon nanotubes can dramatically increase thermal and electrical conductivity, while adding different species of nanoparticles may result in enhanced dielectric properties, optical properties, or greater mechanical properties such as stiffness and strength.

In particular, polymer nanocomposites ("PNCs") are rapidly emerging as one of the most promising materials that can enhance a multitude of commercial products. PNCs are a class of reinforced polymers with nanoparticles which give them improved barrier properties, fire resistance, mechanical strength, etc. Such properties have made them valuable in components such as panels and as barrier and coating materials in automobile, civil and electrical engineering as well as packaging. Despite their desirable properties, however, PNCs are costly and complex to produce on a commercial-scale.

SUMMARY

Techniques for preparing PNCs are provided. In one embodiment, an apparatus includes a barrel configured to accommodate a raw material; a shaft rotatably disposed in the barrel; a motor coupled to the shaft and configured to rotate the shaft to force the raw material through the barrel; and a die coupled to the barrel and including one or more first injectors configured to inject nano particles into the die, thereby forming a composite material where a layer of the nano particles is disposed over the raw material.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
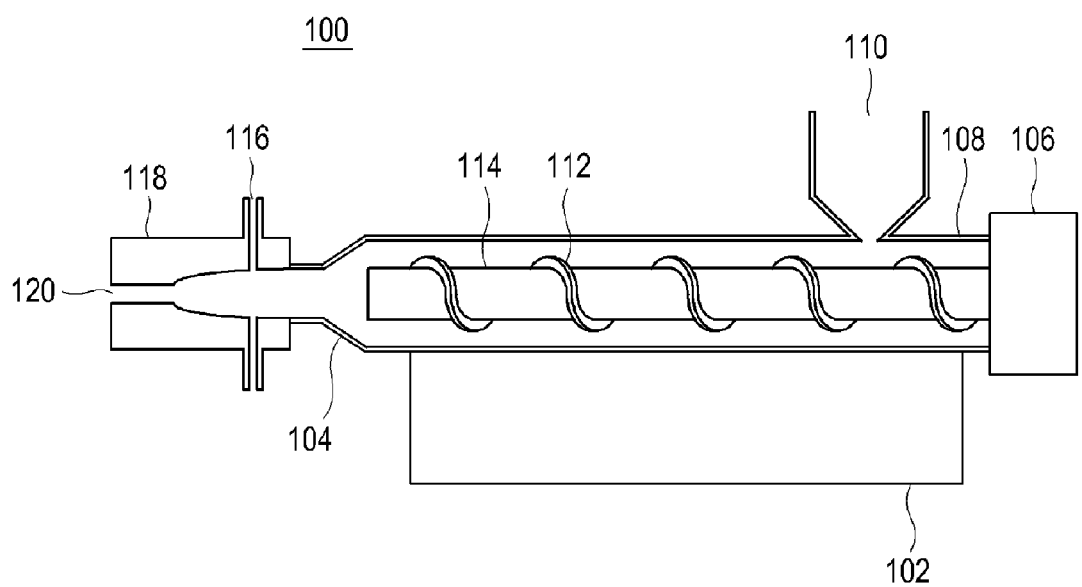
FIG. 1 is a schematic diagram of an illustrative embodiment of a polymer extruder for extruding composite materials with elongated nano particles coated on an extrudable raw material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

Referring to FIG. 1, one illustrative embodiment of a polymer extruder 100 for extruding composite materials is illustrated. As depicted, polymer extruder 100 generally includes a base 102, a feed pipe 104, a motor 106, a barrel 108, a hopper 110, a screw blade 112, a shaft 114, a first injector 116, a die 118, and an opening 120. In some embodiments, polymer extruder 100 may include hopper 110 mounted on one end of barrel 108 to feed extrudable raw materials into barrel 108. Base 102 may be integrated with motor 106, forming a protective housing or enclosure for motor 106 and shaft 114, and constructed of sheet metal or aluminum alloys, or any other suitable material. Polymer extruder 100 includes feed pipe 104 on another end of barrel 108 to physically couple barrel 108 to die 118, and to form a passageway through which the raw materials from barrel 108 can be discharged into die 118. Die 118 may include one or more first injectors 116.

Polymer extruder 100 may receive the raw materials (e.g., thermoplastic and thermosetting polymers which may optionally include therein composites, carbon composites, graphite/epoxy composites, steel reinforced composites or any combination thereof) through hopper 110. In some embodiments, hopper 110 may be integrally molded with barrel 108, and have a generally circular or rectangular cross-section. As shaft 114 is rotated by motor 106, polymer extruder 100 may force the raw materials toward die 118 to be extruded through opening 120, thereby manufacturing an article made from the raw materials.

Shaft 114 is rotatably disposed in barrel 108. Screw blade 112 is securely attached helically around shaft 114. Other screw blade designs and shapes may be adopted in polymer extruder 100 to force the raw materials towards die 118 when shaft 114 is rotated by motor 106. For example, there may be more than one screw blade 112 helically attached around shaft 114. Motor 106 is operatively coupled to shaft 114 to rotate shaft 114 in a predetermined direction at a certain rotation rate. For example, motor 106 may include an AC or DC electric motor.

As depicted in FIG. 1, hopper 110 is disposed at one end of barrel 108, near motor 106 (hereinafter, a "proximal zone" of barrel 108). Hopper 110 receives and holds the raw materials in the form of small beads or pellets, thereby allowing the raw materials to be fed from hopper 110 into barrel 108. In some embodiments, the raw materials may be thermoplastic polymers including, without limitation, polypropylene homopolymers, polypropylene copolymers, blends thereof, and the like. For example, the homopolymers may include atactic polypropylene, isotactic polypropylene, syndiotactic polypropylene, blends thereof, and the like. The copolymer can be a random copolymer, a statistical copolymer, a block copolymer, blends thereof, and the like. In some embodiments, additives such as colorants and UV inhibitors (e.g., in either liquid or pellet form) may be added to be mixed into the composite materials. It is appreciated that other polymers or other extrudable materials and mixtures may also be used as the raw materials as long as nano particles can be coated thereon inside the die 118.

Motor 106 rotates shaft 114 at a predetermined rotation rate to force the raw materials towards die 118 (hereinafter, a "distal zone" of barrel 108). For example, motor 106 may apply a predetermined torque to rotate shaft 114 according to various factors such as viscosity of the raw materials, e.g., at up to 100 to 300 rpm. In this way, the raw materials inside barrel 108 may advance from the proximal to the distal zone toward die 118, which is coupled to barrel 108 via feed pipe 104.

Polymer extruder 100 may include a heater (not shown) to heat barrel 108 to an elevated temperature, thereby transferring heat for melting the raw materials inside barrel 108. For example, the heater may heat barrel 108 up to the melting (or softening) temperature of the raw materials in barrel 108, e.g., to an elevated temperature of about 200° C. or higher. In some embodiments, polymer extruder 100 may include one or more heating elements along the length of barrel 108 to provide a predetermined heating profile along barrel 108. For example, polymer extruder 100 may include multiple independently-controlled heating elements (not shown) that gradually increase the temperature of barrel 108 from the proximal zone to the distal zone of the barrel 108, thereby allowing the raw materials to melt gradually as proceed through barrel 108. In this way, it is possible to lower the risk of overheating which may cause degradation in the raw materials.

In some embodiments, polymer extruder 100 may include a screen pack (not shown) through which the molten (or softened) raw materials pass to remove any solid contaminants. The screen pack may be disposed at the opening of barrel 108, e.g., between barrel 108 and feed pipe 104. In this case, barrel 108 and the screen pack may be reinforced to prevent leakage of the raw materials from barrel 108. For example, barrel 108 and the screen pack may be sealed with adhesives or other sealants. In this way, the screen pack may serve to provide back pressure in barrel 108, to facilitate uniform melting and proper mixing of the raw materials.

Upon exiting from barrel 108, the molten raw materials pass through feed pipe 104 to enter die 118. In some embodiments, die 118 of polymer extruder 100 includes one or more first injectors 116 which are disposed near feed pipe 104 and provide injection paths for nanoparticles. First injectors 116 may be disposed flush with an internal lumen of die 118 and injects nano particles into the stream of the molten raw materials in die 118, thereby forming a layer of the nano particles on the surface of the molten raw materials as they are extruded through opening 120.

Figure 2:
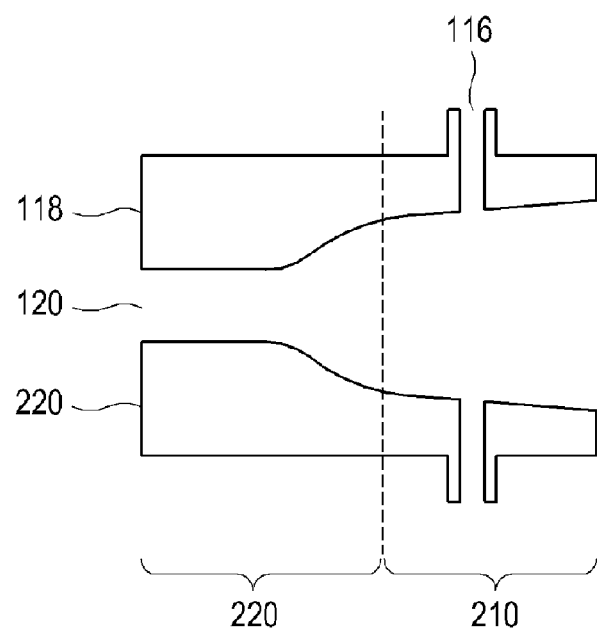
FIG. 2 is a schematic diagram of an illustrative embodiment of a die of the polymer extruder.

Referring to FIG. 2, one illustrative embodiment of die 118 of polymer extruder 100 is shown. Die 118 has a lumen of which radius decreases from a proximal zone 210 of die 118 to a distal zone 220 of die 118. As the molten raw materials are pushed along this contracting path, the molecules of the raw materials become realigned. When the molten raw materials pass through die 118, nanoparticles are fed onto the molten raw materials. Die 118 may have various different shapes and sizes to optimally localize the nano particles in the regions of the highest shear stress in die 118. For example, as shown in FIG. 2, the proximal zone of the lumen of die 118 may have a curvature which is concave outward, while the distal zone defines a curvature which is concave inward. It should be appreciated, however, that these curvatures may vary depending upon detailed configuration of the distal end of die 118, for other curvatures may also be adopted as far as such curvatures may contribute to localizing the nano particles in the regions of the highest shear stress in die 118.

Figure 3:
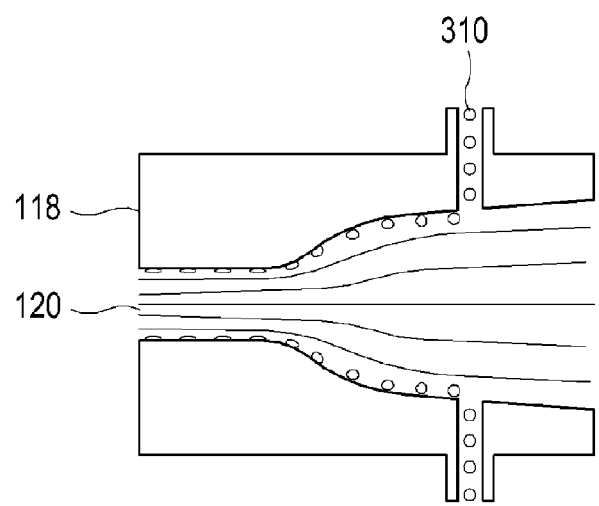
FIG. 3 is a schematic diagram illustrating streamlines of a molten raw material and elongated nano particles inside the die.

Referring to FIG. 3, illustrative examples of streamlines of molten composite materials and elongated nano particles inside die 118 are illustrated. When the raw materials pass through die 118, the nano particles that are received through first injectors 116 are fed onto the surface of the molten raw materials. The location of first injector 116 may depend on various factors such as, e.g., viscosity of the molten raw materials, linear or volumetric flow rate of the molten raw materials, temperature profile inside die 118, pressure distribution inside die 118, desired amount of the nano particles to be coated on the molten raw materials, fluid dynamic and kinematic properties of the nano particles, the properties of a solution in which the nano particles are suspended, and the like. It should be appreciated that these factors for determining the location of first injector 116 may be selected from one or more properties that are generally well known to one of ordinary skill in the relevant art such as polymer chemistry and processing, rheology, and the like.

As depicted in FIG. 3, first injectors 116 are generally flush with the lumen of die 118 to ensure the nano particles to flow near the wall of die 116, thereby allowing the nano particles to become distributed proximate to the inner wall of die 116. In this way, the maximum shear stress may be exerted by the wall of die 116 to the molten composite materials that flow through die 116 so that the nano particles may be realigned in the direction of flow of the molten raw materials in die 118, as they flow toward distal zone 220 of die 118. That is, such configuration of first injector 116 and die 118 may maximize so-called "shear stress-mediated alignment" of the nano particles on the surface of the molten raw materials, while minimizing loss of nano particles entrapped in an interior of the molten raw materials.

In some embodiments, polymer extruder 100 may include a cooling device to cool off the nano-composite (i.e., the molten raw materials coated with nano particles) as the molten nano-composite is extruded from die 118. When the nano-composite is extruded from die 118 through opening 120, the molten nano-composite may be cooled, e.g., by pulling extruder 100 through a water bath or leaving extruder 100 in room temperature for a predetermined period of time.

Figure 4:
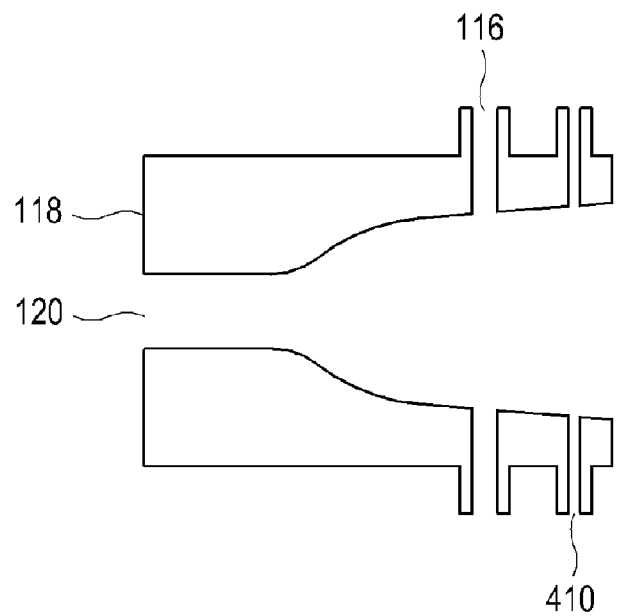
FIG. 4 shows a schematic diagram of an illustrative embodiment of a die with additional injectors.

Referring to FIG. 4, one illustrative embodiment of die 118 incorporating a second injector 410 is illustrated. Die 118 includes second injector 410 to receive an additional substance, e.g., a coupling substance or binder, to be fed into die 118 to facilitate the coupling of the molten raw materials with the nano particles. Second injector 410 may be disposed at a position in die 118 that may allow the coupling substance to coat the surface of the molten raw materials. For example, one or more second injectors 410 may be disposed between feed pipe 104 and first injectors 116. The coupling substance may include various substances to coat the surface of the molten raw materials, and thus, may be selected according to detailed chemical or physicochemical properties of the nano particles and molten raw materials, which are generally well known to those skilled in the relevant art, including but not limited to, 1-methoxy-2-amino-4-(β-hydroxyethyl amino)benzene, 2-amino-3-hydroxypyridine, 3-amino-2-methylamino-6-methoxypyridine, resorcinol, 2-methyl resorcinol, 4-chlororesorcinol, 2-amino-4-chlorophenol, 1,3-diaminobenzene, 1,6-dihydroxynaphthaline, 1,7-dihydroxynaphthaline, 2-aminophenol and/or 3-aminophenol. In some embodiments, instead of supplying a coupling substance from second injector 410 into die 118, the coupling substance may be fed through first injector 116 together with the nano particles depending upon chemical properties of the raw materials, nano particles or solution in which the nano particles are suspended or dissolved.

Figure 5:
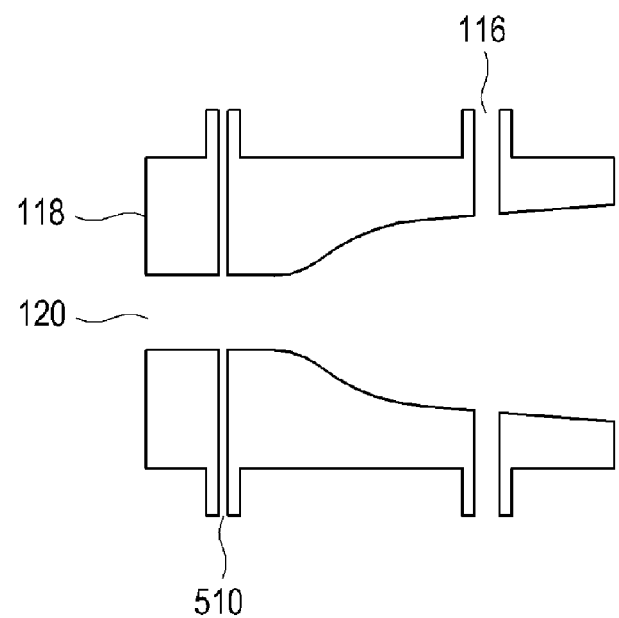
FIG. 5 shows a schematic diagram of another illustrative embodiment of a die with additional injectors.

Referring to FIG. 5, another illustrative embodiment of die 118 incorporating a second distal-zone injector 510 is shown. Die 118 includes second distal-zone injector 510 to receive an additional substance, e.g., a die-releasing agent, to be fed into die 118 to facilitate the nano particles to be released from the inner wall of die 118. The second distal-zone injector 510 may be disposed at a position in die 118 that allow the die-releasing agent to facilitate the molten raw materials escaping die 118 to be released from the inner wall of die 118. For example, one or more second distal-zone injectors 510 may be disposed between opening 120 and first injector 116. As depicted, die 118 includes first injector 116 at the proximal zone of die 118 and second distal-zone injector 510 at the distal zone of die 118. In some embodiments, the nano particles supplied from first injector 116 may be coated on the surface of the molten raw materials flowing through die 118, and the die-releasing agent fed through second distal-zone injector 510 may be further deposited onto the nano particles. In this way, a layer of the die-leasing agent is deposited on the nano particles so that the die-leasing agent may prevent the nano particles from being affected by the viscous interaction and from being segregated from the molten raw materials as they are extruded from die 118. In some embodiments, the die-releasing agent may be selected according to detailed chemical or physicochemical properties of the nano particles and the molten raw materials. For example, the die-releasing agent may include various substances (e.g., colloidal carbon) to physically release the nano particles from the inner wall of die 118 by its intervening disposition between the nano particles and the inner wall of die 118 and to chemically release the nano particles due to its low viscosity, and the like.

The aforementioned polymer extruder 100 may produce various polymeric nano-composites of which surfaces are coated with elongated nano particles which are in turn aligned along the longitudinal axes of the articles. In some embodiments, the articles may be made of any thermoplastic polymers or of any mixtures which include at least a minimal amount of thermoplastic polymers for fabrication, e.g., through polymeric extrusion. The thermoplastic polymers may include without limitation: polypropylene homopolymers, polypropylene copolymers, or blends thereof, and the like. For example, the homopolymer includes atactic polypropylene, isotactic polypropylene, syndiotactic polypropylene, blends thereof, and the like. The copolymer can be a random copolymer, a statistical copolymer, a block copolymer, blends thereof, and the like. The nano particles may be any elongated materials or molecular aggregates having aspect ratios, e.g., greater than 10, 50, 100, 500. The nano particles may include, but not limited to, carbon nano-tubes, carbon nano wires, and the like. Depending on usage and application, the nano-composites may be generally insulative or only marginally conductive. Similarly, the nano-composites may be typically non-polar or only marginally polar. In alternative embodiments, when desired, the nano-composites may be processed to be conductive (or polar) or loaded with a conductive (or polar) additive.

Figure 6:
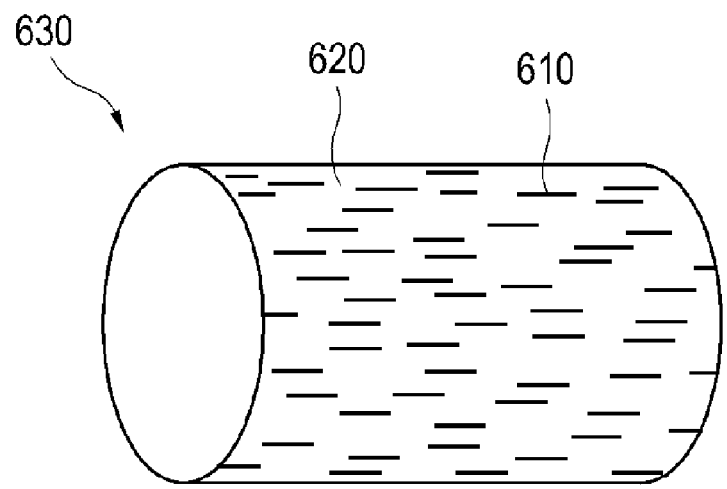
FIG. 6 shows a perspective view of an illustrative embodiment of a circular cross-sectioned composite rod on which elongated nanoparticles are aligned in a direction of a longitudinal axis of the rod.

FIGS. 6 to 11 show illustrative embodiments of nano-composite articles 630, 730, 840, 930, 1040, 1140. The elongated nano particles are coated and aligned on the surface of the raw materials to form an article having various shapes such as a rod, a slab and the like and cross-sections including but not limited to a rectangle, a square, a circle, an eclipse, a ring and the like. FIG. 6 shows a perspective view of an illustrative embodiment of a circular cross-sectioned composite rod on which elongated nano particles are aligned in a direction of a longitudinal axis of the rod. Article 630 has a circular cross-section and includes elongated nano materials 610 (e.g., nanoparticles) deposited, adsorbed, absorbed or coated on a surface 620 of article 630.

Figure 7:
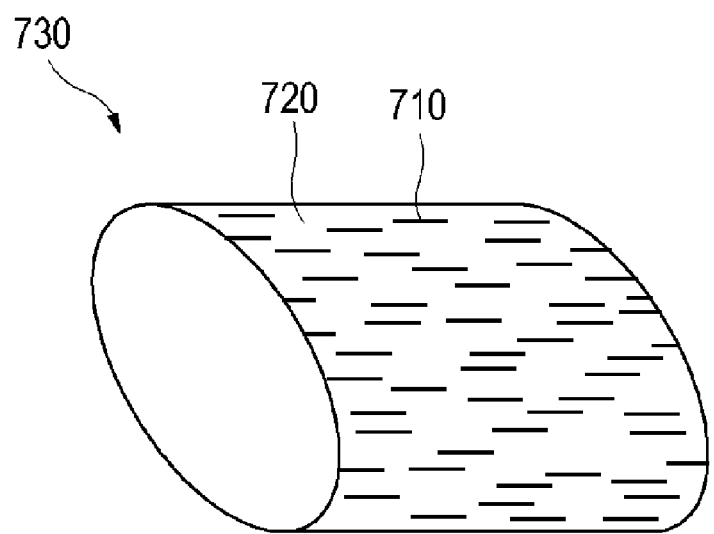
FIG. 7 shows a perspective view of an illustrative embodiment of an oval cross-sectioned composite rod on which elongated nano particles are aligned in a direction of a longitudinal axis of the rod.
Figure 8:
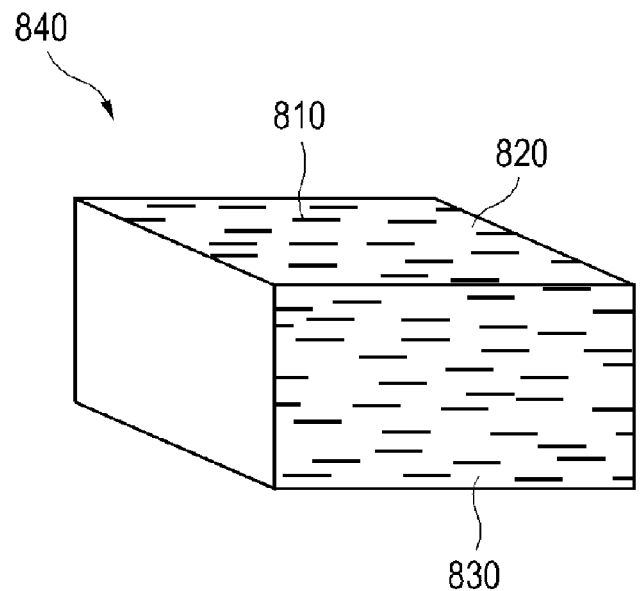
FIG. 8 shows a perspective view of an illustrative embodiment of a square cross-sectioned composite slab on which elongated nano particles are aligned in a direction of a longitudinal axis of the slab.
Figure 9:
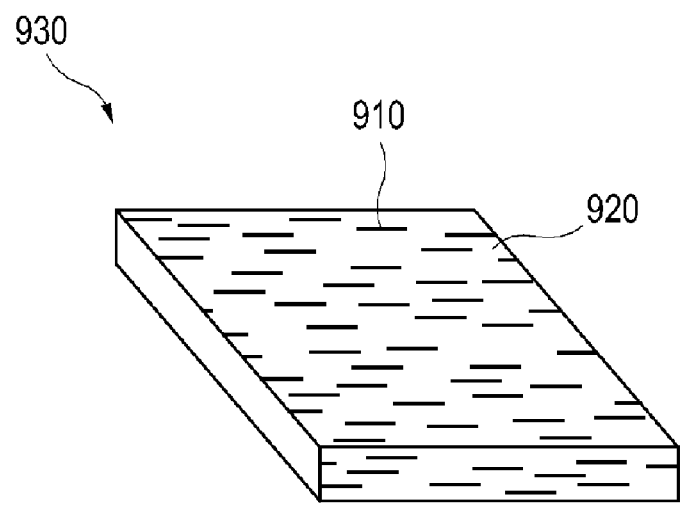
FIG. 9 shows a perspective view of an illustrative embodiment of a rectangular cross-sectioned composite slab on which elongated nano particles are aligned in a direction of a longitudinal axis of the slab.
Figure 10:
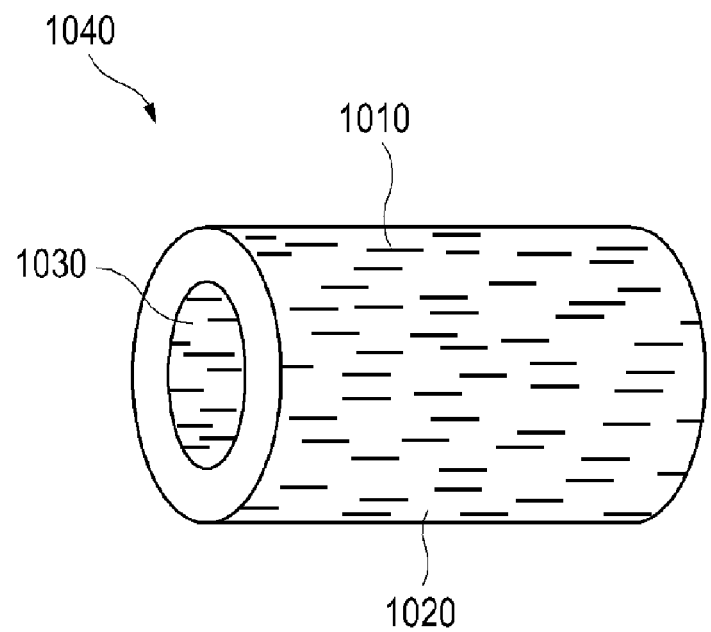
FIG. 10 shows a perspective view of an illustrative embodiment of an annular composite rod defining inner and outer surfaces both of which are coated with elongated nano particles aligned in a direction of a longitudinal axis of the rod.
Figure 11:
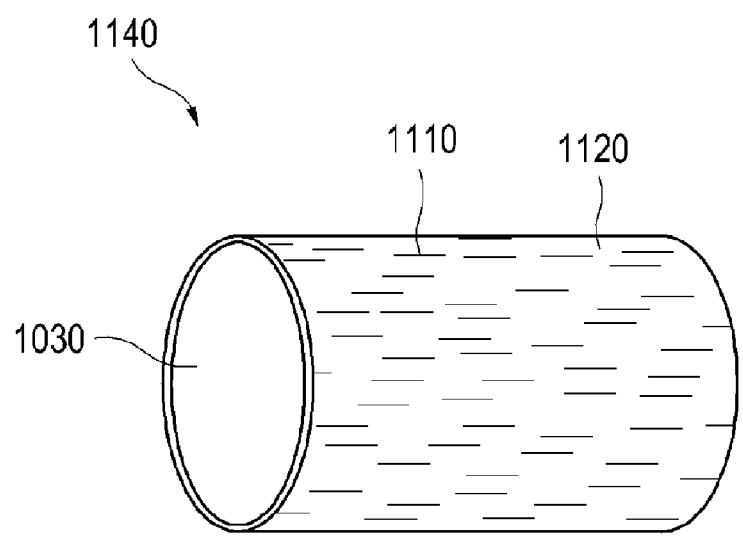
FIG. 11 shows a perspective view of the composite rod of FIG. 6 with an additional coating layer in one embodiment.

FIG. 7 shows one embodiment of an oval cross-sectioned composite rod on which elongated nano particles are aligned in a direction of a longitudinal axis of the rod. Article 730 has an oval cross-section and includes elongated nano materials 710 deposited, adsorbed, absorbed or coated on a surface 720 of article 730. FIG. 8 shows one illustrative embodiment of a square cross-sectioned composite slab on which elongated nano particles are aligned in a direction of a longitudinal axis of the slab. Article 840 includes elongated nano materials 810 deposited, absorbed, adsorbed or coated on the surfaces 820, 830 of article 840. Article 840 has a square cross-section or a cross-section of a rectangle of an aspect ratio close to 1.0. FIG. 9 shows one illustrative embodiment of a rectangular cross-sectioned composite slab on which elongated nano particles are aligned in a direction of a longitudinal axis of the slab. Article 930 includes elongated nano materials 910 deposited, absorbed, adsorbed or coated on surface 920. Article 930 has a cross-section of a rectangle of an aspect ratio, e.g., less than 0.5. FIG. 10 shows one embodiment of an annular composite rod defining inner and outer surfaces both of which are coated with elongated nano particles aligned in a direction of a longitudinal axis of the rod. Article 1040 includes elongated nano materials 1010 deposited, adsorbed, absorbed or coated on an inner surface 1030 and an outer surface 1020 of article 1040. Article 1040 has the shape of a hollow or annular rod. FIG. 11 shows the composite rod of FIG. 6 which includes an additional coating layer in one embodiment. Article 1140 includes elongated nano materials 1110 deposited, absorbed or coated on an inner surface 1030 of article 1140 to form an outer surface 1020. As illustrated in FIG. 11, the cylindrical rod of FIG. 1 may include a coating layer which may serve to facilitate adhesion of nano particles onto the surface of article 1140, to mechanically protect the nano particles from wear and tear, to electrically insulate the nano particles, thereby providing a uniform electrical continuity, and the like.

Figure 12:
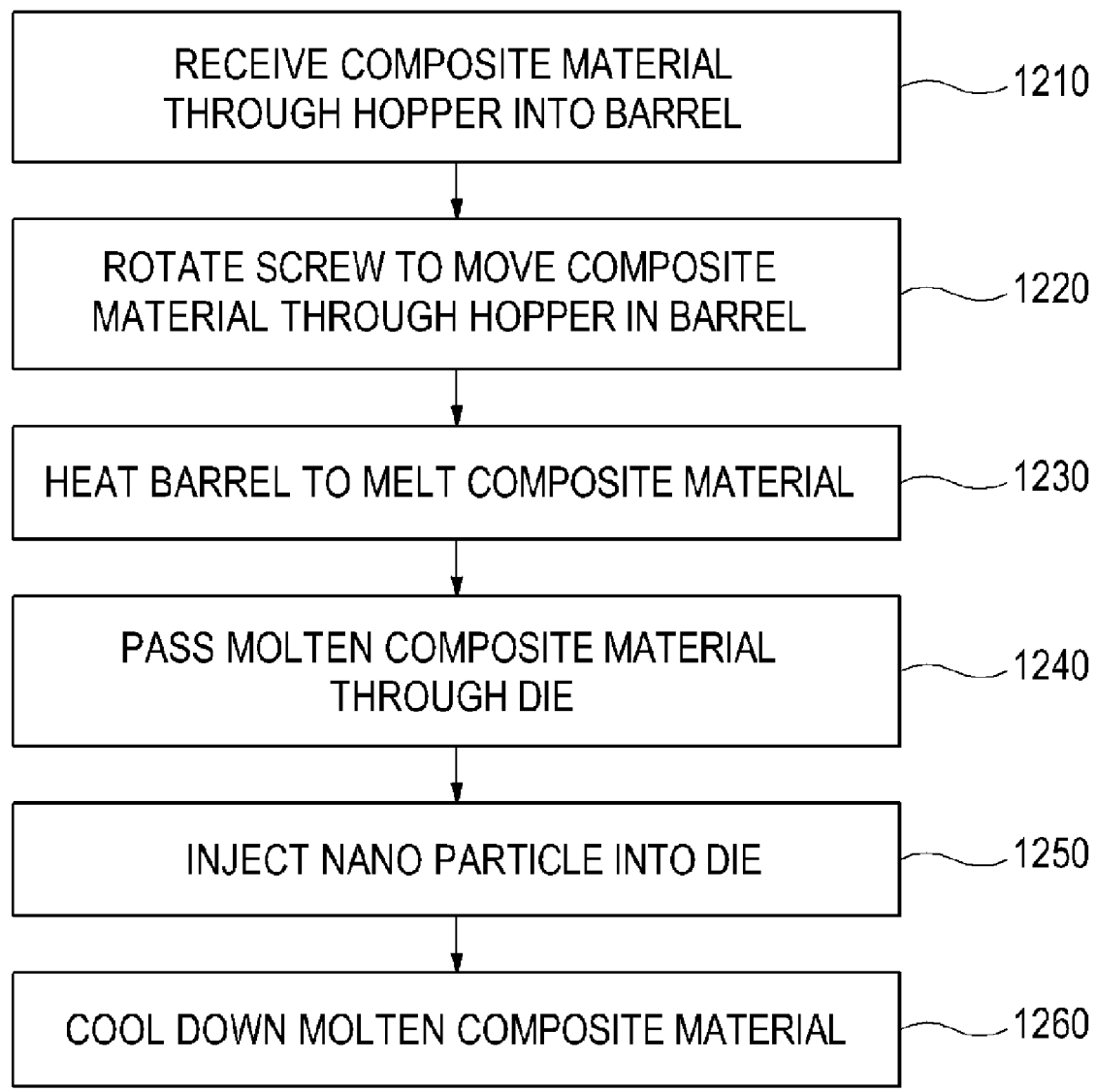
FIG. 12 is a flow chart of an illustrative embodiment of a method for manufacturing an article on which nano particles are coated in accordance with one embodiment.

Referring to FIG. 12, one embodiment of a method for manufacturing an article on which nano particles are coated is illustrated. At block 1210, hopper 110 of polymer extruder 100 receives composite materials to thereby allow the composite materials to be fed from top-mounted hopper 110 into barrel 108. The thermoplastic polymers may include, without limitation: polypropylene homopolymer, polypropylene copolymers, blends thereof, and the like. For example, the homopolymer may include atactic polypropylene, isotactic polypropylene, syndiotactic polypropylene, blends thereof, and the like. The copolymer can be a random copolymer, a statistical copolymer, a block copolymer, blends thereof, and the like. In some embodiments, additives such as colorants and UV inhibitors (e.g., in either liquid or pellet form) may be mixed into the composite materials.

At block 1220, the motor 106 rotates screw blade 112 and shaft 114 at a predetermined rotation rate to force the composite materials to move toward the distal zone of barrel 108. For example, motor 106 may apply a predetermined torque to rotate screw blade 112 and shaft 114 at up to 100 to 200 rpm. In this way, the composite materials in barrel 108 may move toward die 118 that is coupled to barrel 108 via feed pipe 104. At block 1230, a heater may heat barrel 108 to an elevated temperature to transfer to melt the composite materials in barrel 108. For example, the heater may heat barrel 108 to the melting temperature of the composite materials in barrel 108, e.g., to an elevated temperature of about 200° C. or higher. In some embodiments, polymer extruder 100 may include one or more heating elements to provide a heating profile along barrel 108. For example, polymer extruder 100 may have multiple independently-controlled heating elements that gradually increase the temperature of barrel 108 from the proximal zone of barrel 108 to the distal zone of barrel 108, thereby allowing the composite materials to melt gradually as they proceed through barrel 108. At block 1240, upon exiting from barrel 108, the molten composite materials pass through die 118.

At block 1250, the nano particles are injected through one or more first injectors 116 disposed in the proximal zone of die 118 and provide injection paths for the nano particles. First injectors 116 may be disposed flush with an internal lumen of die 118 and inject the nano particles into the stream of the molten composition materials, thereby forming a layer of the nano particles on the surface of the molten composition materials. First injectors 116 are generally flush with the lumen of die 118 to allow the nano particles to become distributed proximate to an inner wall of die 116, thereby ensuring the nano particles to flow near the wall of die 116. In this way, the maximum shear stress may be exerted by the wall of die 116 to the molten composite materials that flows through die 116, thereby allowing the nano particles to be realigned in the direction of flow of the molten composite materials in die 118 as the materials flow toward distal zone 220 of die 118. That is, such configuration of first injector 116 and die 118 may maximize so-called "shear stress-mediated alignment" of the nano particles on the surface of the molten composite materials while minimizing the loss of the nano particles entrapped in an interior of the molten composite materials.

At block 1260, a cooling device cools off the molten composite materials coated with the nano particles when the molten composite materials is output from die 118. When the composite materials escape from die 118 through opening 120, the molten composite materials may be cooled, e.g., by pulling extruder 100 through a water bath or leaving extruder 100 in room temperature for a predetermined period of time.

In light of the present disclosure, those skilled in the art will appreciate that the systems, apparatus, and methods described herein may be implemented in hardware, software, firmware, middleware, or combinations thereof and utilized in systems, subsystems, components, or sub-components thereof. For example, a method implemented in software may include computer code to perform the operations of the method. This computer code may be stored in a machine-readable medium, such as a processor-readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., by a processor, a computer, etc.).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus comprising:
   a barrel configured to accommodate an extrudable raw material;
   a shaft rotatably disposed in the barrel;
   a motor coupled to the shaft and configured to rotate the shaft to force the raw material through the barrel;
   a heater configured to melt at least a portion of the raw material passing through the barrel;
   a die coupled to the barrel and including one or more first injectors configured to inject nano-particles into the die, thereby forming at least one layer of the nano-particles over the molten raw material; and
   a supply of nanoparticles operably coupled to the one or more first injectors.

2. The apparatus of claim 1, further comprising a hopper disposed at and in communication with one end of the barrel, and configured to feed the composite material into the barrel.

3. The apparatus of claim 1, further comprising a base over which the barrel is disposed.

4. The apparatus of claim 1, wherein the one or more first injectors are configured to be disposed in a proximal zone of the die.

5. The apparatus of claim 4, wherein the one or more first injectors are further configured to be disposed according to at least one of factors including a viscosity of the composite material, a linear flow rate of the composite material, a volumetric flow rate of the composite material, a temperature profile in the die, a pressure distribution in the die, an amount of nano particles to be coated on the composite material, and a fluid dynamic and kinetic properties of the nano particles.

6. The apparatus of claim 1, wherein the die includes a second injector configured to inject an additional substance between an inner wall of the die and the nano particles in the die.

7. The apparatus of claim 6, wherein the additional substance includes a coupling substance or a die-releasing agent.

8. The apparatus of claim 1, wherein the heater is configured to heat the barrel to a predetermined temperature above 200° C.

9. The apparatus of claim 8, wherein the heater is configured to gradually increase the temperature of the barrel from a proximal zone of the barrel to a distal zone of the barrel.

10. The apparatus of claim 1, wherein the motor is configured to rotate the shaft at a rotation rate greater than 100 rpm.

11. The apparatus of claim 1, wherein the one or more first injectors are configured to inject the nanoparticles into the die to align the nanoparticles in a flow direction of the composite materials.

12. The apparatus of claim 1, wherein the die is configured to have a lumen of which radius decreases from a proximal zone of the die to a distal zone of the die.

13. The apparatus of claim 1, further comprising a supply of a thermoplastic polymer operably coupled to the barrel.

14. The apparatus of claim 1, wherein the nanoparticles in the supply of nanoparticles have an aspect ratio greater than 10.

15. The apparatus of claim 1, wherein the nanoparticles in the supply of nanoparticles comprise at least one of carbon nanotubes or carbon nanowires.

16. The apparatus of claim 12, wherein at least a portion of the inner surface of the lumen in the distal zone is concave inward.

17. An apparatus comprising:
a barrel configured to accommodate an extrudable raw material;
a shaft rotatably disposed in the barrel;
a motor coupled to the shaft and configured to rotate the shaft to force the raw material through the barrel;
a heater configured to melt at least a portion of the raw material passing through the barrel;
a die coupled to the barrel, wherein the die comprises a lumen having radius that decreases from a proximal zone of the die to a distal zone of the die, and wherein at least a portion of the inner surface of the lumen in the distal zone is concave inward;
a first injector configured to inject nanoparticles into the distal zone of the die, thereby forming a layer of the nanoparticles over the raw material; and
a supply of nanoparticles operably coupled to the first injector.

18. The apparatus of claim 17, wherein the first injector is generally flush with the inner surface of the lumen.

19. The apparatus of claim 17, wherein the nanoparticles in the supply of nanoparticles have an aspect ratio greater than 10.

20. The apparatus of claim 17, further comprising a supply of a thermoplastic polymer operably coupled to the barrel.

21. The apparatus of claim 17, wherein the nanoparticles comprise at least one of carbon nanotubes or carbon nanowires.

* * * * *